2,741,899

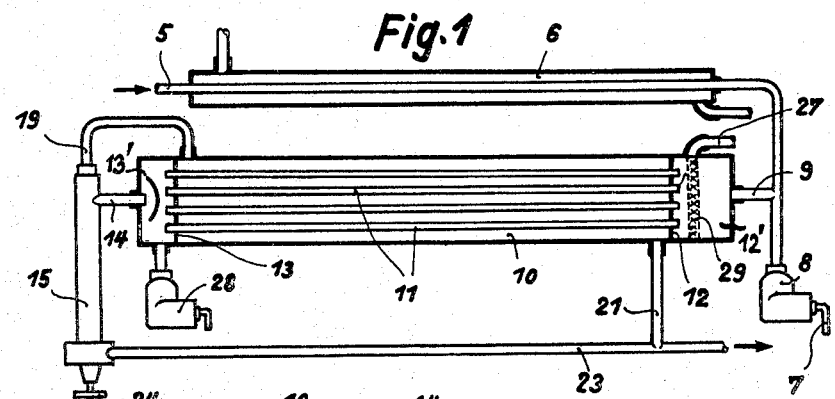
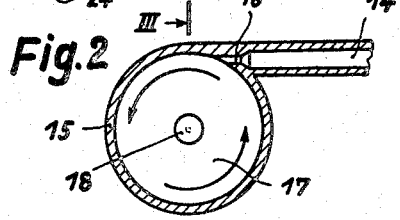
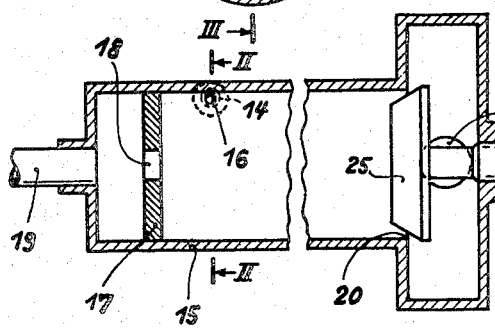
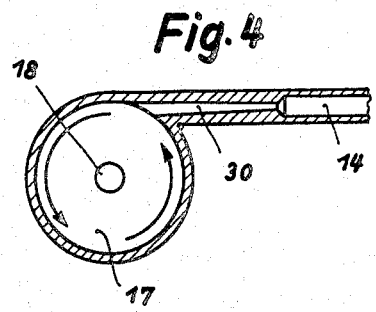
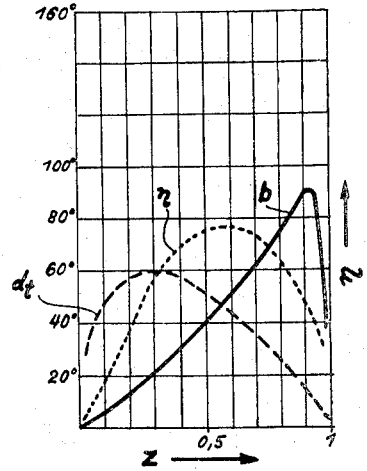
INVENTOR:
ROBERT A. K. VON LINDE
BY  A. John Michel
ATTORNEY.

COOLING OF COMPRESSED GAS

Robert Albert K. von Linde, Planegg, near Munich, Germany

Application October 6, 1951, Serial No. 250,049

Claims priority, application Germany October 23, 1950

7 Claims. (Cl. 62—136)

This invention relates to a system for cooling a compressed gas current, of the type in which a compressed gas current is caused to rotate at a high speed along the circumferential direction defined by the inner wall of a hollow body of a geometrical shape generated by rotation, whereby it is expanded and divided into a heated partial current issuing from the peripheral zone of this hollow space and a cooled partial current coming from the axial zone thereof. It has been found by experiments that the fall of temperature occurring in the partial stream taken from the core zone of the hollow body and applicable for cooling purposes depends substantially on the ratio $z$=cold partial flow/total amount of gas. Numerous tests carried out with compressed air and other compressed gases have shown that the maximum reduction of temperature in this "core flow" occurs at $z = 0.25$–$0.3$.

Now, according to the present invention it has been found that the compressed gas can be cooled down particularly efficiently if the compressed gas before its expansion is subjected to an exchange of heat with the cooled core flow and if the share of cold partial current is at least 70 percent of the total amount. True, only a small drop in temperature is produced in this case in the partial flow applicable for cooling purposes. However, since this partial flow forms a substantial share of the total amount of compressed gas and hence is able to cool this amount of compressed gas effectively before it enters into the hollow body, the apparatus in accordance with the present invention in operation produces very quickly a reduction of the temperature in the compressed gas proceeding to a very low final temperature.

According to a further feature of the invention this intensive fall of temperature can be utilized, for instance, for freeing the compressed gases or air from entrained liquefiable components, more particularly steam, to an extent hitherto unattainable unless absorbents were used which have to be continuously replenished.

By my novel apparatus already at compression pressures of 6 to 10 atmospheres gauge pressure, degrees of dryness can be reached which in case of the known gas drying plants using a compressor and a water-cooled separator could be attained only at the expense of a substantially higher compression output. My novel apparatus, therefore, can be used with advantage in plants for producing and utilizing protective gases for furnaces, since in such plants the contents of steam in the gas should be as low as possible.

According to a further important feature of the present invention a partial flow utilizable for cooling purposes with a particularly favorable efficiency can be taken from the hollow body of rotation by shaping the guide device causing the rotation of the gas in the hollow body in such a manner that the gas is forced to rotate at supersonic speed. This may be achieved, for instance, by constructing the nozzle for feeding the compressed gas into the hollow body of rotation in the form of a so-called de Laval nozzle which is slightly conically expanding in the direction of flow, as known per se.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a diagrammatic view of a plant having the invention applied thereto,

Fig. 2 is a cross sectional view through the device for producing the fall of temperature, Fig. 3 is an axial section thereof, on a somewhat larger scale, Fig. 4 is a cross section through a particularly favorable modification of such a device, and

Fig. 5 is a graph.

Similar reference numerals denote similar parts in the different views.

Referring now to the drawing in greater detail, and first to Fig. 1, it will be seen that a precooler 6 is inserted in the delivery pipe 5 of a gas compressed to a pressure of about 6 to 10 atmospheres gauge pressure by means of a compressor (not shown). The part of moisture of the gas depositing in this cooler is separated in a collecting vessel 8 constructed in the form of a steam trap, and removed through a discharge branch 7. The gas saturated at the end temperature reached in the cooler 6 and at the compression pressure passes through a duct 9 into a counterflow heat exchanger 10 comprising an inlet chamber 12' and an outlet chamber 13' formed by two partition walls 12 and 13. Tightly inserted in the partition walls are cooling tubes 11 which are open at both ends. The compressed gas issuing from these tubes into the outlet chamber of the heat exchanger 10 flows through a short pipe 14 into a nozzle 16 (Figs. 2 and 3) opening tangentially into a hollow body 15 of a geometrical shape generated by rotation.

Arranged in this hollow body which has the shape of a cylindrical tube, is a diaphragm 17 having an axial bore 18. An expanded partial current issuing through this aperture is permitted to flow off through a pipe 19 into the hollow space formed by the heat exchanger 10 and from said hollow space into a consumer pipe 21. Another partial current, on the contrary, coming from the gas rotating at a high velocity along the inner wall of the hollow body 15 and being heated thereby, passes through an annular slit 20 into a branch pipe 23 issuing into the consumer pipe 21. The size of the passageway formed by the annular slot at the front edge of the tube 15 can be changed by a valve head 25 by means of a handle 24.

The apparatus constituted by the hollow body or casing 15 in connection with the nozzle 16 and the diaphragm 17, 18 is known as a so-called "Ranque tube" or "vortex tube" and described in greater detail in United States Patent No. 1,952,281. For the reasons set forth in said patent the partial current escaping from tube 15 through pipe 19 is of a considerably lower temperature than the initial gas current while the second partial current escaping from the tube through the slit 20 defined by the valve cone 25 is of a higher temperature than the fluid admitted at 16. The graph shown in Fig. 5 shows that the efficiency of the vortex tube if used in connection with the gas drying system in accordance with the present invention depends largely on the adjustment of the valve 25. The abscissa "$z$" indicates the fraction $$\frac{\text{cold partial gas current}}{\text{total gas current}}$$

while $d_t$ is the difference between the temperature of the cold partial gas current and the temperature of the initial or total gas current entering at 14 (dash-line curve marked $d_t$), plotted in degrees C., and measured in a vortex tube of the type shown in Fig. 3, with a compressed air current of 70 p. s. i. gauge pressure. The efficiency $\eta$ of the vortex tube as indicated by the dotted line curve $\eta$ has been computed therefrom; the curve "b" indicates the reduction of the gas temperature leaving the heat exchanger or gas cooler 10 at 14 in relation to the gas entering at 9 if the cold partial current (19) is used to cool the entering compressed gas, with due consideration of the losses in the heat exchanger. It will be seen from the curves in Fig. 5 that if the cross section of the passageway in the annular slot 20 is adapted to the width in the clear of the diaphragm aperture 18 in such a manner that the cold partial current entering into the heat exchanger 10 comprises at least 70 percent of the total amount of gas fed through the nozzle 16 ($z=0.7$), the cooling $d_t$ attainable in the hollow body 15 is substantially less than the maximum value of about 60° C. attainable in case of $z=0.25$ to 0.3. Yet, as shown by the curve b, the compressed gas is cooled to a particularly low temperature if $z$ is greater than 0.7 and preferably approximately 0.9. It is remarkable that in this range even the efficiency $\eta$ of the transformation of energy has already surpassed its maximum value which has been reached approximately at the value $z=0.6$.

Owing to the low temperatures attainable in the heat exchanger 10 in accordance with the present invention, the components fed with the compressed gas and to be precipitated by cooling are deposited almost completely. If these components remain liquid, they can be separated automatically in a second separator 28 which is constructed similar to the condensation water remover or steam trap 8. Where the substances to be deposited, such as, the gas moisture, at the low temperatures form solid deposits on the heat exchanging surfaces, the operation can be carried out with two heat exchangers of similar construction which are adapted to be inserted alternately in the gas ducts while the other heat exchanger in turn is cut out for thawing off the deposits.

However, it is also possible to avoid the formation of deposists of hoar frost and to maintain continuous operation with only one heat exchanger by feeding to the chamber of the heat exchanger 10 before the partition wall 12 as per Fig. 1, through a pipe 27, a solvent preventing freezing up, which solvent is distributed, for instance, in a porous substance 29 and absorbed by the compressed gas passing through this substance. This solvent wets the inner walls of the tubes 11, thereby causing continuous removal of the components deposited by the cooling process, more particularly the gas moisture, in a liquid state, by the separator 28.

If the mouth of the pipe 19 in the hollow body 15 has an internal diameter corresponding to the diaphragm aperture 18, the diaphragm 17 can be dispensed with. The compressed gas issues at the velocity of sound from the nozzle 16 shown in Fig. 2. However, it is also possible, by shaping the feed nozzle 30 for the gaseous working agent in the manner shown in Fig. 4, to reach supersonic velocities which cause a substantial increase of the velocity of rotation in the hollow body 15 and thus a substantially higher cooling action. In the example shown in Fig. 4 this is achieved by a slightly conically shaped so-called de Laval nozzle 30 whose narrowest cross section faces the feed pipe 14.

The system according to the present invention can be used with particular advantage in plants for the production and use of protective gas in which in per se known manner a combustible gas and air are burnt at such a proportion of mixture that the atmospheric oxygen is completely used up, and in which the pressured gases of combustion are cooled down for removing the moisture contents. The plant according to the present invention permits to utilize a part of the work of compression employed in the form of a refrigeration output which is particularly effective for this purpose and to reach degrees of dryness which hitherto could have been realized only by the use of compression pressures which cannot be justified economically.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In the process of drying a non-recycled stream of gas, the steps which comprise, in the following order, viz: passing the gas in compressed condition through a heat exchanger for cooling it, removing the condensate, allowing the thus dried gas to expand substantially to atmospheric pressure in a vortex tube adapted to divide the compressed gas into a first stream of a higher temperature and a second stream of a lower temperature, passing the second stream, but not the first stream, through the heat exchanger, then combining the first and the second stream, and feeding the combined gas stream into a consumer pipe.

2. In the process of drying a non-recycled stream of gas, the steps which comprise, in the following order, viz: precooling a compressed gas, removing the condensate, passing the pre-cooled gas in compressed condition through a heat exchanger for cooling it to a lower temperature, removing the condensate produced by said second cooling, allowing the thus dried gas to expand substantially to atmospheric pressure in a vortex tube adapted to divide the compressed gas into a first stream of a higher temperature and a second stream of a lower temperature, passing the second stream, but not the first stream, through the heat exchanger, then combining the first and the second stream, and feeding the combined gas stream into a consumer pipe.

3. In the process of drying a non-recycled stream of gas, the steps which comprise, in the following order, viz: passing the gas in compressed condition through a heat exchanger for cooling it, removing the condensate, allowing the thus dried gas to expand substantially to atmospheric pressure in a vortex tube adapted to divide the compressed gas into a first stream of a higher temperature and a second stream of a lower temperature, in such a way that the proportion of said second stream is in the neighbourhood of 90% by volume of the total flow of gas passed through the vortex tube, passing the second stream, but not the first stream, through the heat exchanger, then combining the first and the second stream, and feeding the combined gas stream into a consumer pipe.

4. In the process of drying a non-recycled stream of gas, the steps which comprise, in the following order, viz: passing the gas in compressed condition through a heat exchanger for cooling it, removing the condensate, allowing the thus dried gas to expand substantially to atmospheric pressure by acceleration to supersonic velocity, in a nozzle arranged in a vortex tube adapted to divide the compressed gas into a first stream of a higher temperature and a second stream of a lower temperature, passing the second stream, but not the first stream, through the heat exchanger, then combining the first and the second stream, and feeding the combined gas stream into a consumer pipe.

5. A plant for drying a non-recycled stream of gas, comprising a heat exchanger adapted for cooling a compressed gas passing through it, means for removing the condensate produced by the cooling, a vortex tube adapted to allow expansion of the thus dried gas to substantially atmospheric pressure, by dividing the gas into a first stream of a higher temperature and a second stream of a lower temperature, means for passing the second stream, but not the first stream, through the heat exchanger for cooling the compressed gas, a consumer pipe, and pipe means for combining the first and second streams in the consumer pipes, after passage of the second stream through the heat exchanger.

6. A plant for drying a non-recycled stream of gas, comprising a heat exchanger adapted for cooling a compressed gas passing through it, means for removing the condensate produced by the cooling, a vortex tube adapted to allow expansion of the thus dried gas to substantially atmospheric pressure, by dividing the gas into a first stream of a higher temperature and a second stream of a lower temperature, means for regulating the ratio of distribution in the vortex tube in such a way that the second stream comprises a proportion in the neighbourhood of 90% by volume of the total flow of gas passed through the vortex tube, means for passing the second stream, but not the first stream, through the heat exchanger for cooling the compressed gas, a consumer pipe, and pipe means for combining the first and second streams in the consumer pipes, after passage of the second stream through the heat exchanger.

7. A plant for drying a non-recycled stream of gas, comprising a heat exchanger adapted for cooling a compressed gas passing through it, means for removing the condensate produced by the cooling, a vortex tube adapted to allow expansion of the thus dried gas to substantially atmospheric pressure, by dividing the gas into a first stream of a higher temperature and a second stream of a lower temperature, an inlet nozzle in said vortex tube for accelerating the gas to supersonic velocity, means for passing the second stream, but not the first stream, through the heat exchanger for cooling the compressed gas, a consumer pipe, and pipe means for combining the first and second streams in the consumer pipes, after passage of the second stream through the heat exchanger.

References Cited in the file of this patent

UNITED STATES PATENTS

| | | |
|---|---|---|
| 1,040,886 | Claude | Oct. 8, 1912 |
| 1,694,308 | Bowen | Dec. 4, 1928 |
| 1,704,649 | Bowen | Mar. 5, 1929 |
| 1,952,281 | Ranque | Mar. 27, 1934 |
| 2,522,787 | Hughes | Sept. 19, 1950 |
| 2,581,168 | Bramley | Jan. 1, 1952 |